US011322112B2

(12) United States Patent
Nakajima et al.

(10) Patent No.: US 11,322,112 B2
(45) Date of Patent: May 3, 2022

(54) DISPLAY DEVICE, AND CONTROL METHOD FOR DISPLAY DEVICE

(71) Applicant: JVCKENWOOD Corporation, Yokohama (JP)

(72) Inventors: Nobuki Nakajima, Yokohama (JP); Takeshi Makabe, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/198,374

(22) Filed: Mar. 11, 2021

(65) Prior Publication Data

US 2021/0350760 A1 Nov. 11, 2021

(30) Foreign Application Priority Data

May 8, 2020 (JP) .............................. JP2020-082743

(51) Int. Cl.
*G09G 3/36* (2006.01)

(52) U.S. Cl.
CPC ......... *G09G 3/3696* (2013.01); *G09G 3/3607* (2013.01)

(58) Field of Classification Search
CPC combination set(s) only.
See application file for complete search history.

(56) References Cited

U.S. PATENT DOCUMENTS

| 5,318,033 A * | 6/1994 | Savord ................ G01S 7/52028 600/447 |
| 7,139,042 B2 * | 11/2006 | Nam ...................... H04N 13/32 349/15 |
| 2005/0206597 A1 * | 9/2005 | Ishii ..................... G09G 3/3688 345/87 |
| 2011/0249014 A1 | 10/2011 | Kolstad et al. |

FOREIGN PATENT DOCUMENTS

JP        2013-524662        6/2013

\* cited by examiner

*Primary Examiner* — Van N Chow
(74) *Attorney, Agent, or Firm* — Amin, Turocy & Watson, LLP

(57) ABSTRACT

A display device includes a plurality of display elements, a first light source that emits first illumination light, a second light source that emits second illumination light, a signal synthesizing unit configured to generate a mixed image signal based on an input signal, a pixel control unit configured to, based on the mixed image signal, control a voltage applied to the display elements, and a light source control unit configured to control the first and second light sources. During period in which the second illumination light is emitted, the pixel control unit is configured to control a voltage applied to some display elements of the plurality of display elements according to signal value of the input signal and at same time, regardless of signal value of the input signal, set a voltage applied to some other display elements of the plurality of display elements to a constant value.

6 Claims, 6 Drawing Sheets

150   ● : s-POLARIZED LIGHT   ↔ : p-POLARIZED LIGHT

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

1 FRAME

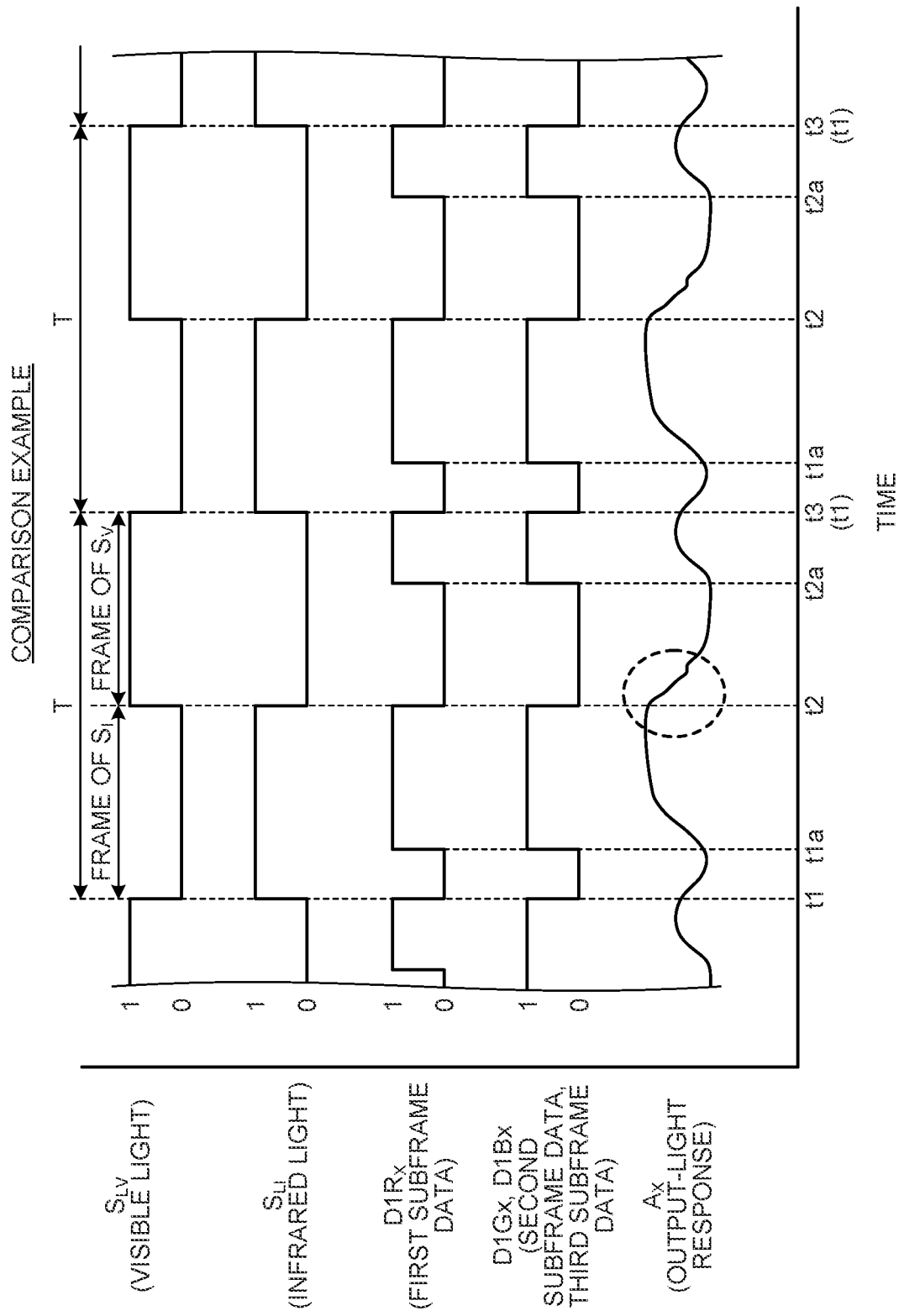

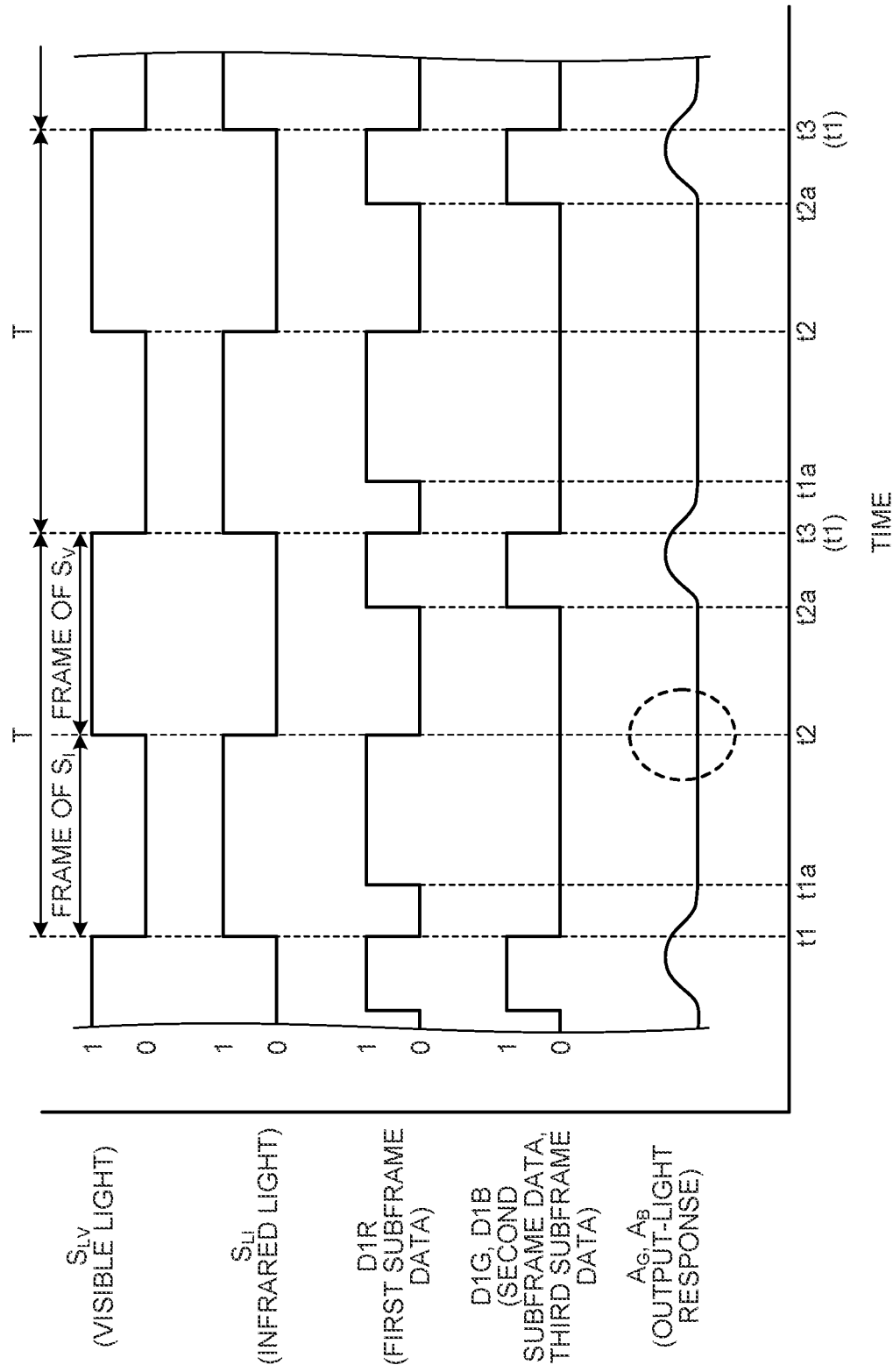

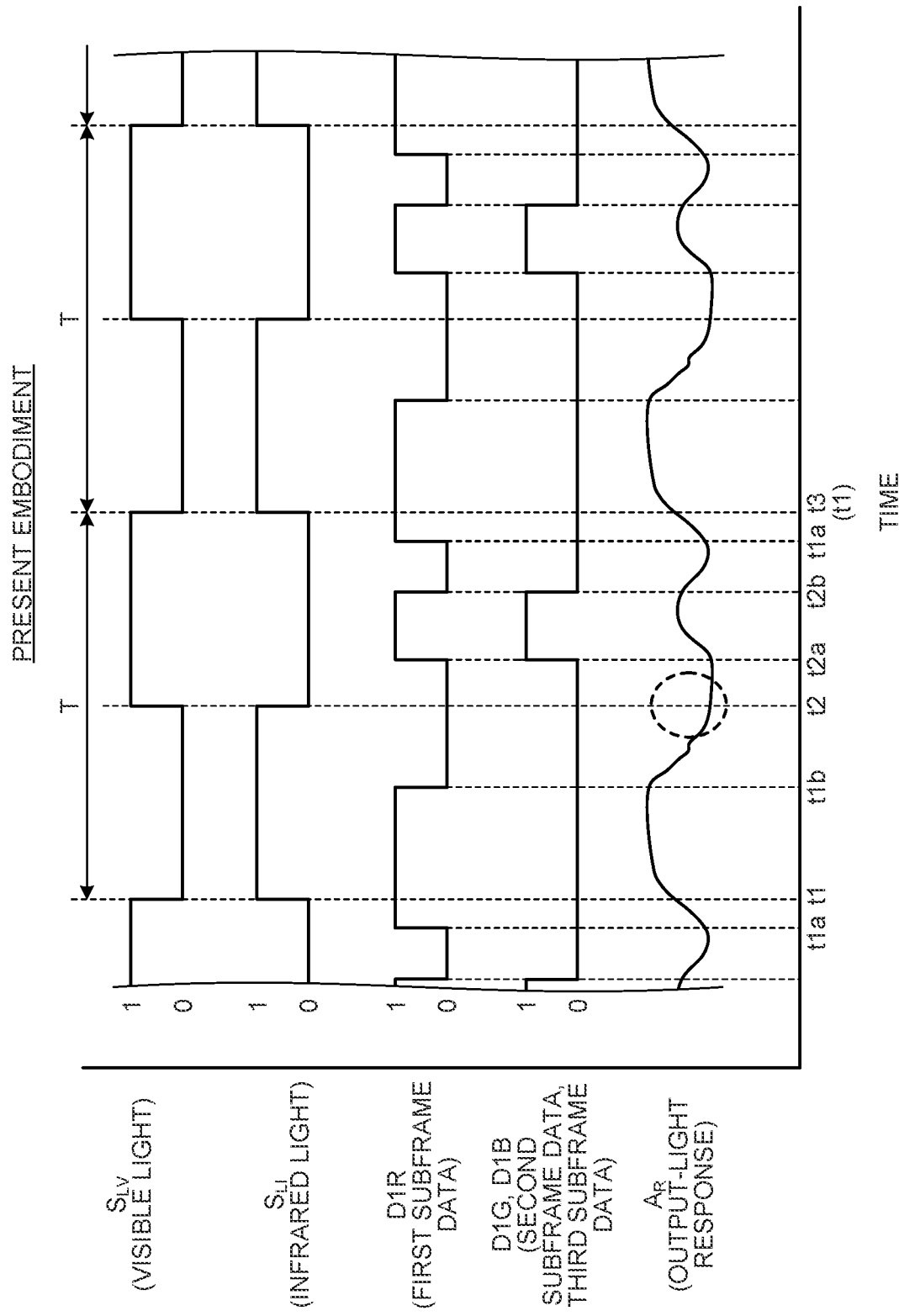

DISPLAY DEVICE, AND CONTROL METHOD FOR DISPLAY DEVICE

CROSS-REFERENCE TO RELATED APPLICATIONS

This application claims priority from Japanese Application No. 2020-082743, filed on May 8, 2020, the contents of which are incorporated by reference herein in its entirety.

BACKGROUND

The present disclosure relates to a display device and a control method for the display device.

In the pilot training for flying an airplane or a helicopter, in addition to providing the actual flight training, it is also effective to provide training based on a training simulator system that is capable of replicating various situations. Particularly, during the night flight of a helicopter, there are times when one of the main pilot and the copilot navigates with the naked eye, and the other navigates while wearing a night-vision goggle. In that regard, a simulation system has been developed in which a visible-light video and an infrared-light video are displayed on screens so that the pilot navigating with the naked eye and the pilot wearing a night-vision goggle can take training at the same time. In Japanese Translation of PCT International Application Publication No. 2013-524662 is disclosed a projector that projects a visible-light video as well as an infrared-light video onto the same display device. In Japanese Translation of PCT International Application Publication No. 2013-524662, it is disclosed that video signals for a visible-light video and video signals for an infrared-light video are output according to the frame sequential method, that is, are sequentially output in a time-division manner.

However, when video signals for a visible-light video and video signals for an infrared-light video are output in a sequential manner, there is a risk of occurrence of what is called a crosstalk. For example, even after a switch is made from outputting the video signals for the infrared-light video to outputting the video signals for the visible-light video, a residual image that is attributed to the video signals for the infrared-light video remains present and is visually confirmed as a crosstalk. For that reason, in the case of displaying a plurality of images based on lights having different wavelength bands, such as displaying visible-light images and infrared-light images; it is required to hold down the occurrence of a crosstalk.

SUMMARY

A display device according to an aspect of the present disclosure includes a plurality of display elements, a first light source, a second light source, a signal synthesizing unit, a pixel control unit, and a light source control unit. The first light source emits first illumination light having first wavelength band. The second light source emits second illumination light having second wavelength band. The signal synthesizing unit is configured to, based on an input signal, generate a mixed image signal in which frames of a first image signal, which is meant for displaying an image based on the first illumination light, and frames of a second image signal, which is meant for displaying an image based on the second illumination light, are repeated in an alternate manner. The pixel control unit is configured to, based on the mixed image signal, control a voltage applied to the display elements. The light source control unit is configured to control the first light source and the second light source. During period in which the second illumination light is emitted, the pixel control unit is configured to control a voltage applied to some display elements of the plurality of display elements according to signal value of the input signal and at same time, regardless of signal value of the input signal, set a voltage applied to some other display elements of the plurality of display elements to a constant value.

A control method for a display device according to an aspect of the present disclosure is a control method for a display device including a plurality of display elements, a first light source that emits first illumination light having first wavelength band, and a second light source that emits second illumination light having second wavelength band. The control method includes signal-synthesizing step of generating, based on an input signal, a mixed image signal in which frames of a first image signal, which is meant for displaying an image based on the first illumination light, and frames of a second image signal, which is meant for displaying an image based on the second illumination light, are repeated in an alternate manner; pixel-controlling step of controlling, based on the mixed image signal, a voltage applied to the display elements; and light-source-controlling step of controlling the first light source and the second light source. The pixel-controlling step includes controlling, during period in which the second illumination light is emitted, a voltage applied to some display elements of the plurality of display elements according to signal value of the input signal and at same time, regardless of signal value of the input signal, setting a voltage applied to some other display elements of the plurality of display elements to a constant value.

BRIEF DESCRIPTION OF THE DRAWINGS

FIG. 6 is a schematic diagram for explaining the display of an image according to a comparison example;

FIG. 7 is a schematic diagram for explaining the display of an image according to the embodiment; and FIG. 8 is a schematic diagram for explaining the display of an image according to another example of the embodiment.

DETAILED DESCRIPTION

An embodiment according to the present disclosure will be described below in detail with reference to the accompanying drawings. However, the present disclosure is not limited by the embodiment described below.

Configuration of Display Device

Figure 1:
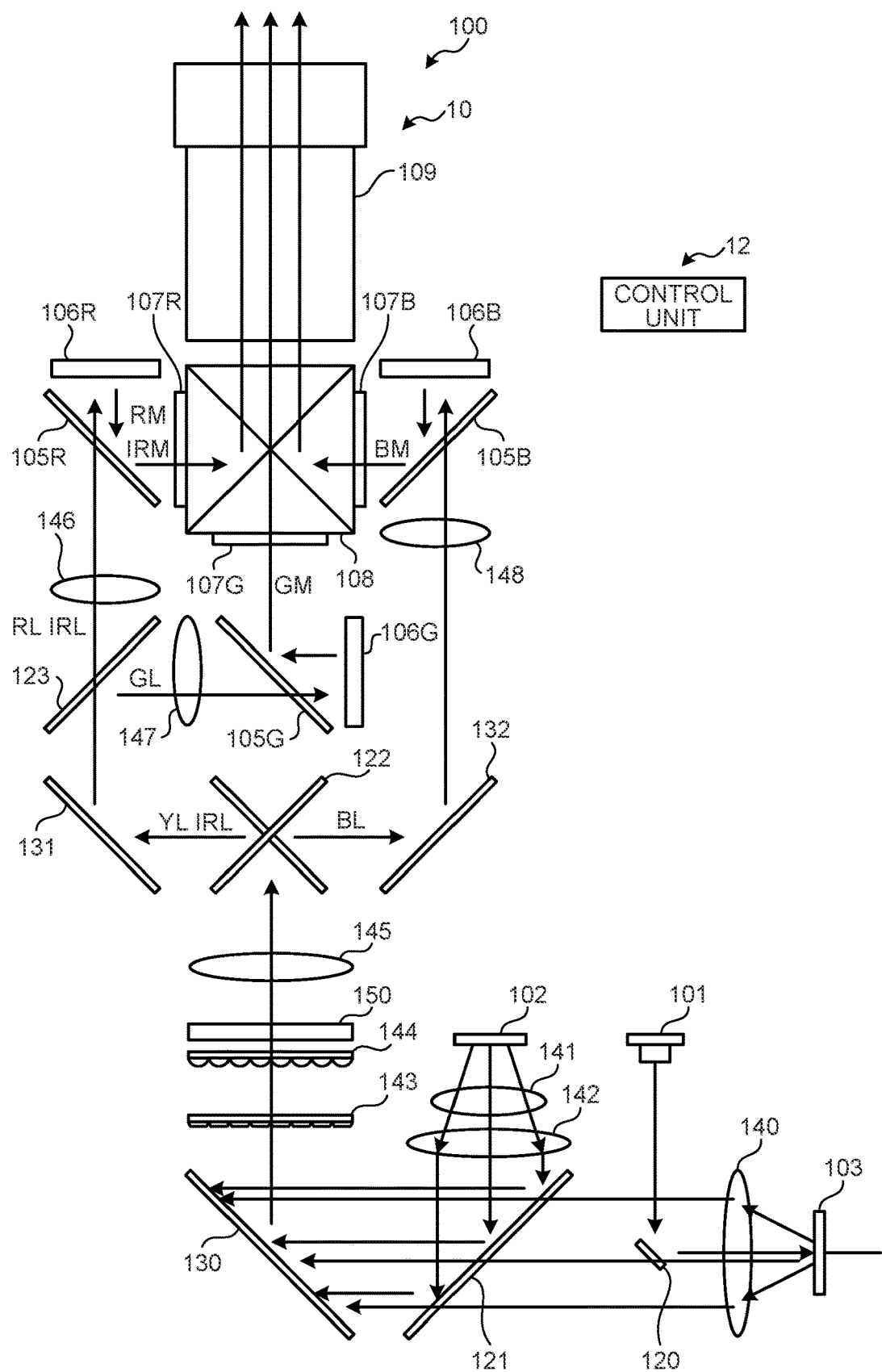
FIG. 1 is a schematic diagram illustrating a display device according to an embodiment.

FIG. 1 is a schematic diagram illustrating a display device according to the present embodiment. As illustrated in FIG. 1, a display device 100 according to the present embodiment includes a display mechanism 10 and a control unit 12. The display device 100 is capable of displaying visible-light images, which are images based on visible light, and infrared-light images, which are images based on infrared light. The display mechanism 10 includes a first light source 101; a second light source 102; a fluorescent body 103; polarizers 105R, 105G, and 105B; a first display element 106R; a second display element 106G; a third display element 106B; polarizers 107R, 107G, and 107B; a color synthesis prism 108; a projector lens 109; dichroic mirrors 120 to 123; reflection mirrors 130 to 132; lenses 140 to 148; and a polarization conversion element 150. When there is no need to distinguish among the first display element 106R, the second display element 106G, and the third display element 106B; they are simply referred to as the display elements 106.

The dichroic mirrors 120 to 123 have the property of separating the incident light by means of reflection and transmission, with the separated wavelengths serving as the separation boundary. The dichroic mirrors 120 to 123 can be manufactured by forming, for example, a dielectric multi-layer film in a predetermined area of a transparent material such as a glass plate or a prism. The optical characteristics can be set according to the material and the thickness of the dielectric body constituting the dielectric multi-layer film.

The first light source 101 emits a first illumination light having a first wavelength band. In the present embodiment, the first wavelength band is the wavelength band of visible light, and the first illumination light is visible light. More particularly, the first light source 101 according to the present embodiment is, for example, a blue laser light source configured with a blue laser element. The blue illumination light is, for example, the light having the wavelength band equal to or greater than 450 nm and equal to or smaller than 495 nm. The first light source 101 emits a blue illumination light, which is a blue laser light, as the first illumination light. The blue illumination light gets reflected from the dichroic mirror 120. The dichroic mirror 120 has the property of reflecting the blue illumination light and transmitting the yellow illumination light.

The blue illumination light emitted by the first light source 101 is reflected from the dichroic mirror 120. Then, the reflected light gets condensed on the lens 140 and is directed onto the fluorescent body 103.

The fluorescent body has a fluorescent layer and a reflecting surface. The fluorescent layer generates a yellow illumination light, which includes a red band component and a green band component having the intensity corresponding to the energy intensity of the blue illumination light emitted by the first light source 101. The reflecting surface reflects the blue illumination light, which has passed through the fluorescent layer, and reflects the yellow illumination light, which is generated in the fluorescent layer.

The yellow illumination light representing the fluorescence generated by the fluorescent body 103 is directed toward the dichroic mirror 120 via the lens 140. The yellow illumination light passes through the dichroic mirror 120 and is directed onto the dichroic mirror 121.

The blue illumination light that has reflected from the fluorescent body 103 is directed toward the dichroic mirror 120 via the lens 140. The surface area of the dichroic mirror 120 is set to be little larger than the luminous flux of the blue laser light emitted by the first light source 101. On the other hand, since the blue illumination light that has reflected from the fluorescent body 103 is scattered at the time of reflection, the blue illumination light that is directed onto the dichroic mirror 120 from the lens 140 has the luminous flux expanding sufficiently with respect to the dimensions of the dichroic mirror 120. That is, the blue illumination light that is directed onto the dichroic mirror 120 via the lens 140 is only partially reflected from the dichroic mirror 120 and is largely directed onto the dichroic mirror 121.

The second light source 102 emits a second illumination light that has a second wavelength band different from the first wavelength band. In the present embodiment, the second wavelength band is the wavelength band of infrared rays; and the second illumination light is infrared light. More particularly, the second light source 102 according to the present embodiment is, for example, an infrared LED light source configured with near-infrared LED elements. The second light source 102 emits infrared LED light. In the following explanation, the infrared LED light is referred to as infrared illumination light. The infrared illumination light has the wavelength band to be equal to or greater than 0.7 μm and equal to or smaller than 1000 μm. The infrared illumination light is directed onto the dichroic mirror 121 via the lenses 141 and 142. The dichroic mirror 121 has the property of reflecting the infrared illumination light and transmitting the blue illumination light and the yellow illumination light.

The blue illumination light and the yellow illumination light, which have passed through the dichroic mirror 121, and the infrared illumination light, which has reflected from the dichroic mirror 121, further get reflected from the reflection mirror 130 and fall on the lens 143.

The lenses 143 and 144 are, for example, fly-eye lenses. The blue illumination light, the yellow illumination light, and the infrared illumination light that are reflected from the reflection mirror 130 get a uniform illumination distribution due to the lenses 143 and 144 before falling on the polarization conversion element 150.

Figure 2:
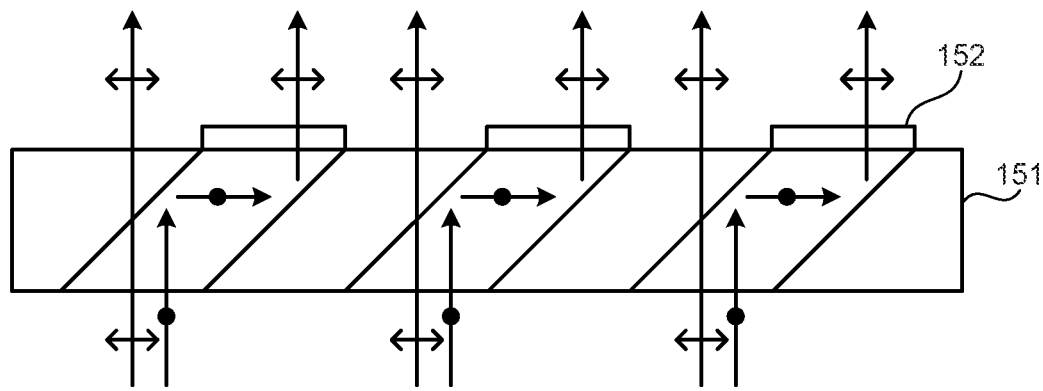
FIG. 2 is a diagram illustrating an exemplary configuration of a polarization conversion element according to the embodiment.

FIG. 2 is a diagram illustrating an exemplary configuration of the polarization conversion element according to the present embodiment. As illustrated in FIG. 2, the polarization conversion element 150 includes a polarization beam splitter 151 and a retardation plate 152. The polarization beam splitter 151 reflects either one of the s-polarized light and the p-polarized light, and transmits the other. In FIG. 2 is illustrated the state in which the polarization beam splitter 151 reflects the s-polarized light and transmits the p-polarized light.

The retardation plate 152 converts either one of the s-polarized light and the p-polarized light into the other. In FIG. 2 is illustrated the state in which the retardation plate 152 converts the s-polarized light into the p-polarized light. The retardation plate 152 is, for example, a λ/2 retardation plate. Each illumination light is converted into the p-polarized light by the polarization conversion element 150.

Returning to the explanation with reference to FIG. 1, each illumination light that is converted into the p-polarized light by the polarization conversion element 150 is directed onto the dichroic mirror 122 via the lens 145. The lens 145 is, for example, a condenser lens.

The dichroic mirror 122 separates a blue illumination light BL, a yellow illumination light YL, and an infrared illumination light IRL that are incident thereon. The yellow illumination light YL and the infrared illumination light IRL that are separated by the dichroic mirror 122 get reflected from the reflection mirror 131 and fall on the dichroic mirror 123.

The dichroic mirror 123 treats an intermediate wavelength of the red light band and the green light band as the separation boundary, and separates the incident yellow illumination light YL and the incident infrared illumination light IRL into a red illumination light RL and the infrared illumination light IRL that include the red band component, and into a green illumination light GL that includes the green band component. More particularly, the dichroic mirror 123 reflects the green band component of the incident yellow illumination light YL so that the green illumination light GL is shot out. The dichroic mirror 123 transmits the red band component of the incident yellow illumination light YL so that the red illumination light RL is shot out. Furthermore, the dichroic mirror 123 transmits the infrared illumination light IRL. Meanwhile, for example, the red illumination light RL has the wavelength band to be equal to or greater than 620 nm and equal to or smaller than 750 nm, and the green illumination light GL has the wavelength band to be equal to or greater than 495 nm and equal to or greater than 570 nm.

The red illumination light RL and the infrared illumination light IRL that are separated by the dichroic mirror 123 are directed onto the polarizer 105R via the lens 146. The green illumination light GL that is separated by the dichroic mirror 123 is directed onto the polarizer 105G via the lens 147. The blue illumination light BL that is separated by the dichroic mirror 122 gets reflected from the reflection mirror 132 and is directed onto the polarizer 105B via the lens 148.

The polarizers 105R, 105G, and 105B have the property of reflecting either one of the s-polarized light and the p-polarized light, and transmitting the other. In FIG. 1 is illustrated the state in which the polarizers 105R, 105G, and 105B reflect the s-polarized light and transmit the p-polarized light. The polarizers 105R, 105G, and 105B are also referred to as reflective polarizers. The polarizers 105R, 105G, and 105B are, for example, wire grid polarizers.

The red illumination light RL and the infrared illumination light IRL that represent the p-polarized light pass through the polarizer 105R and are directed onto the first display element 106R. The green illumination light GL representing the p-polarized light passes through the polarizer 105G and is directed onto the second display element 106G. The blue illumination light BL representing the p-polarized light passes through the polarizer 105B and is directed onto the third display element 106B. In this way, the infrared illumination light IRL emitted by the second light source 102 is directed onto the same first display element 106R onto which the illumination light emitted by the first light source 101 (i.e., herein, the red illumination light RL) is also directed.

The first display element 106R, the second display element 106G, and the third display element 106B are, for example, reflective liquid crystal display elements. In the present embodiment, the explanation is given for the example in which the first display element 106R, the second display element 106G, and the third display element 106B are reflective liquid crystal display elements. However, the display elements are not limited to be of the reflective type, and can alternatively be configured with transmissive liquid crystal elements. Still alternatively, instead of using liquid crystal elements, various other types of display elements can also be used.

The first display element 106R performs light modulation of the red illumination light RL, which is the p-polarized light, based on the image data of the red component; and generates a red image light RM representing the s-polarized light. Moreover, the first display element 106R performs light modulation of the infrared illumination light IRL, which is the p-polarized light, based on the image data of the infrared light component; and generates an infrared image light IRM representing the s-polarized light. The red image light RM and the infrared image light IRM are collectively referred to as a first image light RM/IRM.

The second display element 106G performs light modulation of the green illumination light GL, which is the p-polarized light, based on the image data of the green component; and generates a green image light GM representing the s-polarized light. The third display element 106B performs light modulation of the blue illumination light BL, which is the p-polarized light, based on the image data of the blue component; and generates a blue image light BM representing the s-polarized light. That is, the first display element 106R functions as a light modulation device for red images and a light modulation device for infrared images; the second display element 106G functions as a light modulation device for green images; and the third display element 106B functions as a light modulation device for blue images.

The polarizers 107R, 107G, and 107B have the property of transmitting either one of the s-polarized light and the p-polarized light, and reflecting or absorbing the other. In FIG. 1 is illustrated the state in which the polarizers 107R, 107G, and 107B transmit the s-polarized light and absorb the unnecessary p-polarized light. The polarizers 107R, 107G, and 107B are also referred to as transmissive polarizers.

In displaying the infrared image, it is required to emit the infrared image light with high illuminance. Thus, optical components disposed on an optical path of the infrared illumination light IRL or the infrared image light IRM easily produce heat, as compared with optical components disposed on an optical path of the illumination light or image light of other colors. To cope with that, for the polarizer 107R positioned on an optical path of the infrared image light IRM, a wire grid polarizer having high heat resistance and wideband and good properties is used. With that, reliability and performance of the polarizer can be improved, as compared with a case in which a typical resin-made polarizer is used. On the other hand, the wire grid polarizer is higher than a typical resin-made polarizer in price. Thus, typical resin-made polarizers may be used for the polarizers 107G and 107B not positioned on the optical path of the infrared image light IRM.

The red image light RM and the infrared image light IRM that represent the s-polarized light and that are generated by the first display element 106R get reflected from the polarizer 105R, pass through the polarizer 107R, and are directed onto the color synthesis prism 108. The blue image light BM that represents the s-polarized light and that is generated by the third display element 106B gets reflected from the polarizer 105B, passes through the polarizer 107B, and is directed onto the color synthesis prism 108.

The color synthesis prism 108 reflects the red image light RM, the infrared image light IRM, and the blue image light BM; transmits the green image light GM; and directs each image light onto the projector lens 109.

The red image light RM, the infrared image light IRM, the green image light GM, and the blue image light BM are projected onto a screen (not illustrated) via the projector lens 109. Because of the red image light RM, the green image light GM, and the blue image light BM; a visible light image is displayed. Because of the infrared image light IRM, an infrared light image is displayed.

The display mechanism 10 has the configuration as explained above. However, the display mechanism 10 is not limited to have the configuration as explained above, and can have an arbitrary configuration. For example, the first light source 101 is not limited to emit the blue illumination light as the first illumination light, and can be configured to emit any visible light as long as the light has a different wavelength band than the second light source 102. Moreover, the second light source 102 is not limited to emit the infrared illumination light as the second illumination light. Furthermore, the display mechanism 10 according to the present embodiment is a projector that projects images onto a screen which is installed separately from the display device 100. However, that is not the only possible case. Alternatively, for example, the display mechanism 10 can be a device that displays images on a display configured in an integrated manner with the display device 100.

Figure 3:
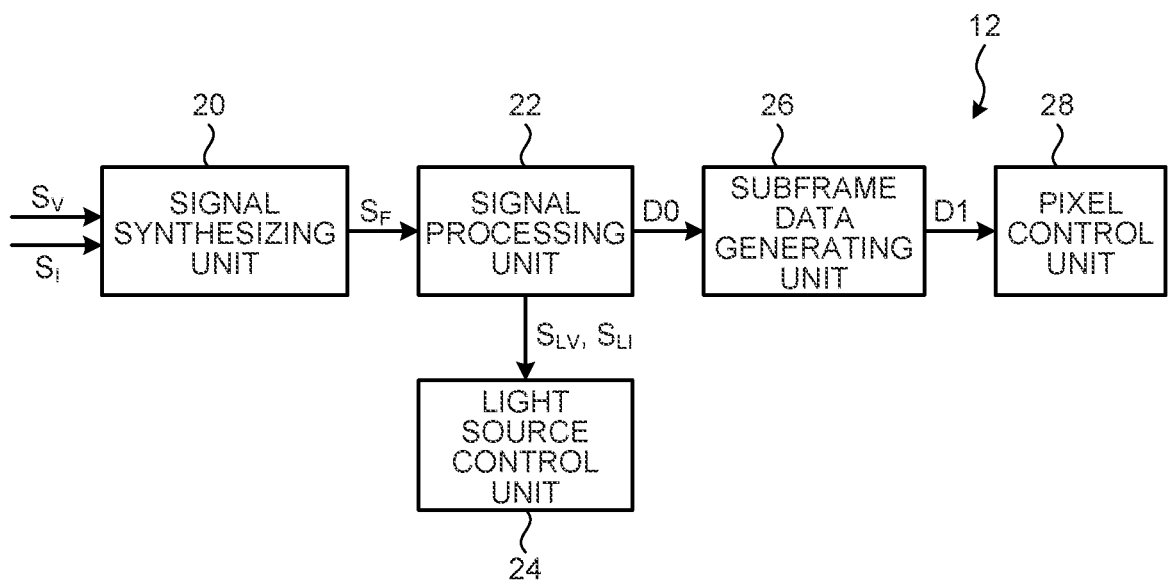
FIG. 3 is a schematic block diagram of a control unit according to the embodiment.
Figures 4, 5:
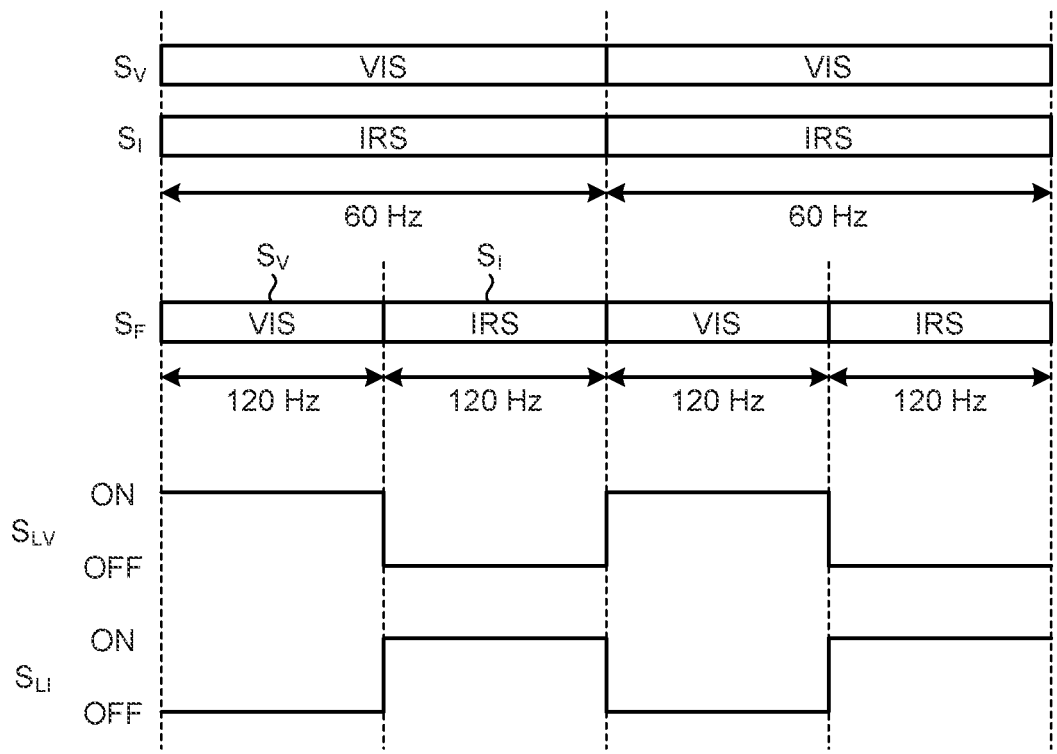
FIG. 4 is a diagram illustrating an example of signals.
FIG. 5 is a diagram illustrating an example of a driving gradation table.

FIG. 3 is a schematic block diagram of the control unit according to the present embodiment. FIG. 4 is a diagram illustrating an example of signals. The control unit 12 controls the display mechanism 10 and displays a visible light image and an infrared light image. As illustrated in FIG. 3, the control unit 12 includes a signal synthesizing unit 20, a signal processing unit 22, a light source control unit 24, a subframe data generating unit 26, and a pixel control unit 28. The signal synthesizing unit 20, the signal processing unit 22, the light source control unit 24, the subframe data generating unit 26, and the pixel control unit 28 can be configured with an integrated circuit representing hardware; or can be configured with a central processing unit (CPU) representing the arithmetic processing device of a computer and with a memory, and the operations (described later) can be performed by making the CPU execute computer programs stored in the memory. In the present embodiment, the pixel control unit 28 is a pixel circuit that drives the display elements 106.

The signal synthesizing unit 20 receives input of a first image signal $S_V$ and a second image signal $S_I$. The first image signal $S_V$ represents an input signal for displaying an image using the light based on the first illumination light and, in the present embodiment, is used to display a visible light image. The first image signal $S_V$ can also be called a video signal for a visible light video. The second image signal $S_I$ represents an input signal for displaying an images using the light based on the second illumination light and, in the present embodiment, is used to display an infrared light image. The second image signal $S_I$ can also be called a video signal for an infrared light video. Since a visible light image and an infrared light image are generated by the first display element 106R, the second display element 106G, and the third display element 106B; the first image signal $S_V$ and the second image signal $S_I$ can be said to include the information related to the voltage applied to the first display element 106R, the second display element 106G, and the third display element 106B. The first image signal $S_V$ and the second image signal $S_I$ that are stored in, for example, an external device can be input to the signal synthesizing unit 20; or the information about the images captured by a camera can be input in real time as the first image signal $S_V$ and the second image signal $S_I$ to the signal synthesizing unit 20. Thus, the method of inputting the first image signal $S_V$ and the second image signal $S_I$ is arbitrary.

The first image signal $S_V$ and the second image signal $S_I$ are segmented into cycles of the processing duration, that is, segmented into framerates; and have an intensity assigned on a framerate-by-framerate basis. In FIG. 4 is illustrated an example in which the first image signal $S_V$ and the second image signal $S_I$ have the same framerate of 60 Hz.

The signal synthesizing unit 20 synthesizes the first image signal $S_V$ and the second image signal $S_I$, and generates a mixed image signal $S_F$. In the mixed image signal $S_F$, the frame of the first image signal $S_V$ and the frame of the second image signal $S_I$ are repeated in an alternate manner, that is, the signals of a single frame of the first image signal $S_V$ and the signals of a single frame of the second image signal $S_I$ are repeated in an alternate manner. The mixed image signal $S_F$ can also be called a frame sequential signal. The signal synthesizing unit 20 converts the framerate (display speed) of the first image signal $S_V$ and the second image signal $S_I$ to a predetermined multiple, and generates the mixed image signal $S_F$ in such a way that the first image signal $S_V$ and the second image signal $S_I$ are alternatively arranged on a frame-by-frame basis. That is, in the mixed image signal $S_F$, a frame of the first image signal $S_V$ and a frame of the second image signal $S_I$ are repeated in an alternate manner. Thus, a frame of the first image signal $S_V$ and a frame of the second image signal $S_I$ constitute a single cycle of the mixed image signal $S_F$. In FIG. 4 is illustrated an example in which the signal synthesizing unit 20 doubles the framerate of 60 Hz of the first image signal $S_V$ and the second image signal $S_I$, and generates the mixed image signal $S_F$ which has the framerate of 120 Hz and in which the first image signal $S_V$ and the second image signal $S_I$ are alternately arranged.

In FIG. 4, although it is illustrated that the first image signal $S_V$ and the second image signal $S_I$ are input at 60 Hz, the frequency is not limited to 60 Hz and another frequency (such as 50 Hz or 24 Hz) can also be used. Moreover, although the signal synthesizing unit 20 converts those signals into signals having the double frequency, the conversion of frequency is not limited to doubling and can be more than two times. Alternatively, the conversion of frequency can be equal to one times (same frequency).

Moreover, the display period of a visible light image and the display period of an infrared light image need not be identical. That is, in the mixed image signal $S_F$, the length of the frames of the first image signal $S_V$ and the length of the frames of the second image signal $S_I$ need not be identical. For example, the configuration can be such that, during the period of 60 Hz, the visible light image is displayed for one-third of the period and the infrared light image is displayed for the two-thirds of the period. Since the infrared light images are assumed to have higher gradation than the visible light images, having a longer display period for the infrared light images enables maintaining their optical intensity at a strong level.

The signal processing unit 22 illustrated in FIG. 3 performs arithmetic operations among surrounding pixels or surrounding frames, and generates image data D0 having N-gradation (where N is a natural number) with respect to the mixed image signals $S_F$. The signal processing unit 22 generates, as image data with respect to the frames of the first image signal $S_V$ and the frames of the second image signal $S_I$, first image data D0R for the first display element 106R, second image data D0G for the second display element 106G, and third image data D0B for the third display element 106B. Then, the signal processing unit 22 outputs the generated image data D0 to the subframe data generating unit 26. The subframe data generating unit 26 refers to a driving gradation table and converts the N-gradation image data D0 into subframe data D1 made of "1" and "0". The subframe data D1 indicates the ON/OFF state of the voltage applied to the display elements 106 within a frame. From the first image data D0R, the signal processing unit 22 generates first subframe data D1R indicating the ON/OFF state of the voltage applied to the first display element 106R. Moreover, from the second image data D0G, the signal processing unit 22 generates second subframe data D1G indicating the ON/OFF state of the voltage applied to the second display element 106G. Furthermore, from the third image data D0B, the signal processing unit 22 generates third subframe data D1B indicating the ON/OFF state of the voltage applied to the third display element 106B.

FIG. 5 is a diagram illustrating an example of the driving gradation table. In the present embodiment, the subframe data generating unit 26 divides a single frame into N number of subframes, and performs gradation display with ON/OFF switching of each subframe. Herein, subframes are sequentially referred to as SF1, SF2, . . . , SFN in chronological order. In the driving gradation table illustrated in FIG. 5, the columns indicate the gradation, and the subframe data D1 is generated based on the values of the driving gradation table that correspond to the gradation of the image data. Meanwhile, in the present embodiment, the explanation is given for the case in which the value of N is set to 12. However, the value of N is not limited to 12, and can be set to another value. For example, the value of N can be 32 or 64. In the driving gradation table according to the present embodiment, accompanying an increase in the gradation, the subframes of "1" go on increasing from the temporally later frames toward the temporally earlier frames. That is, the subframe data D1 is generated in such a way that, in a single frame, accompanying an increase in the gradation of the image data, the subframes of "1" go on increasing from the temporally last subframe toward the temporally earlier subframes. However, the subframe data generating unit 26 is not limited to generate the subframe data D1 in this manner. Alternatively, for example, the subframe data generating unit 26 can generate the subframe data D1 in such a way that, accompanying an increase in the gradation of the image data, the subframes of "1" go on increasing from the temporally first subframe toward the temporally later subframes.

The subframe data generating unit 26 controls the pixel control unit 28 based on the generated subframe data D1. The pixel control unit 28 drives the display elements 106 based on the subframe data D1. More particularly, based on the subframe data D1, the pixel control unit 28 controls the voltage applied to the display elements 106. For example, in the subframe data D1, "1" corresponds to the ON state of the voltage applied to the display elements 106, and "0" corresponds to the OFF state of the voltage applied to the display elements 106. That is, in a single frame, during the period in which there is continuation of "1" in the subframe data D1, the pixel control unit 28 turns ON the voltage applied to the display elements 106. In a single frame, during the period in which there is continuation of "0" in the subframe data D1, the pixel control unit 28 turns OFF the voltage applied to the display elements 106. The pixel control unit 28 controls the voltage applied to the first display element 106R based on the first subframe data D1R; controls the voltage applied to the second display element 106G based on the second subframe data D1R; and controls the voltage applied to the third display element 106B based on the third subframe data D1B. Meanwhile, since the subframe data D1 is generated from the image data D0 that is generated based on the mixed image signal $S_F$, it can be said that the pixel control unit 28 controls the voltage applied to the display elements 106 based on the mixed image signal $S_F$.

The signal processing unit 22 generates a first light source control signal $S_{LV}$ and a second light source control signal $S_{LI}$ that are synchronized with the mixed image signal $S_F$, and outputs them to the light source control unit 24. Based on the first light source control signal $S_{LV}$ and the second light source control signal $S_{LI}$, the light source control unit 24 controls the first light source 101 and the second light source 102. More specifically, the first light source control signal $S_{LV}$ is meant for controlling the first light source 101.

Based on the first light source control signal $S_{LV}$, the light source control unit 24 switches the ON/OFF state of emission of the first illumination light by the first light source 101. Similarly, the second light source control signal $S_{LI}$ is meant for controlling the second light source 102. Based on the second light source control signal $S_{LI}$, the light source control unit 24 switches the ON/OFF state of emission of the second illumination light by the second light source 102. As illustrated in FIG. 4, the cycles of the first light source control signal $S_{LV}$ and the second light source control signal $S_{LI}$ are identical to the cycle of the mixed image signal $S_F$. The first light source control signal $S_{LV}$ has such a cycle that, during the period of a frame of the first image signal $S_V$ in the mixed image signal $S_F$, the emission of the first illumination light is turned ON; and, during the period of a frame of the second image signal $S_I$, the emission of the first illumination light is turned OFF. On the other hand, the second light source control signal $S_{LI}$ has such a cycle that, during the period of a frame of the first image signal $S_V$ in the mixed image signal $S_F$, the emission of the second illumination light is turned OFF; and, during the period of a frame of the second image signal $S_I$, the emission of the second illumination light is turned ON. Meanwhile, in the present example, the first light source control signal $S_{LV}$ and the second light source control signal $S_{LI}$ are generated in order to control the first light source 101 and the second light source 102, respectively. However, alternatively, the first light source 101 and the second light source 102 can be controlled using only a single signal that is synchronized with the mixed image signal $S_F$.

Meanwhile, as illustrated in FIG. 1, the first illumination light emitted by the first light source 101 is directed onto the first display element 106R as the infrared illumination light IRL, onto the second display element 106G as the green illumination light GL, and onto the third display element 106B as the blue illumination light BL. On the other hand, the second illumination light emitted by the second light source 102 is directed only onto the first display element 106R as the infrared illumination light IRL. Hence, it can be said that the light source control unit 24 makes the first light source 101 emit the first illumination light to the first display element 106R, the second display element 106G, and the third display element 106B; and makes the second light source 102 emit the second illumination light only to the first display element 106R from among the first display element 106R, the second display element 106G, and the third display element 106B.

Herein, in a frame of the first image signal $S_V$, that is, during the period of displaying the visible light image; based on the first image signal $S_V$, the pixel control unit 28 according to the present embodiment controls the voltage applied to the first display element 106R, the second display element 106G, and the third display element 106B. On the other hand, in a frame of the second image signal $S_I$, that is, during the period of displaying the infrared light image; based on the second image signal $S_I$, the pixel control unit 28 controls the voltage applied to the first display element 106R and at the same time, regardless of the second image signal $S_I$, sets the voltage applied to the second display element 106G and the third display element 106B to a constant value (in the present embodiment, turns OFF the voltage). The specific explanation is given below.

Comparison Example

FIG. 6 is a schematic diagram for explaining the display of an image according to a comparison example. As illustrated in FIG. 6, in the following example, "0" and "1" of the first light source control signal $S_{LV}$ and the second light source control signal $S_{LI}$, that is, the ON/OFF state of the first illumination light and the second illumination light is repeated for every cycle T that includes timings t1 to t3. During the period from the timing t1 to the timing t2, the first light source control signal $S_{LV}$ is "0", that is, the light source control unit 24 turns OFF the emission of the first illumination light (visible light) by the first light source 101; and the second light source control signal $S_{LI}$ is "1", that is, the light source control unit 24 turns ON the emission of the second illumination light (infrared light) by the second light source 102. Then, during the period from the timing t2 to the timing t3 (i.e., to the timing t1 of the next cycle T), the first light source control signal $S_{LV}$ is "1", that is, the light source control unit 24 turns ON the emission of the first illumination light (visible light) by the first light source 101; and the second light source control signal $S_{LI}$ is "0", that is, the light source control unit 24 turns OFF the emission of the second illumination light (infrared light) by the second light source 102. Meanwhile, at the time of switching between emission of the first illumination light and emission of the second illumination light, a blank period can be set during which neither the first illumination light nor the second illumination light is emitted.

The subframe data is in phase synchronization with the first light source control signal $S_{LV}$ and the second light source control signal $S_{LI}$. That is, from the timing t1 to the timing t2 during which the second light source control signal $S_{LI}$ is turned ON, the subframe data is assigned as the frame of the second image signal $S_I$ meant for displaying the infrared light image; and, from the timing t2 to the timing t3 during which the first light source control signal $S_{LV}$ is turned ON, the subframe data is assigned as the frame of first image signal $S_V$ meant for displaying the visible light image.

In the present embodiment, the first image signal $S_V$ includes information (a signal value) indicating to turn ON the voltage applied to all of the first display element 106R, the second display element 106G, and the third display element 106B. Hence, in a frame of the first image signal $S_V$, first image data D0Rx meant for the first display element 106R, second image data D0Gx meant for the second display element 106G, as well as third image data D0Bx meant for the third display element 106B has gradation of "1" or more according to the signal value of the first image signal $S_V$. For that reason, first subframe data D1Rx meant for the first display element 106R, second subframe data D1Gx meant for the second display element 106G, as well as third subframe data D1Bx meant for the third display element 106B includes a period corresponding to "1". In the example illustrated in FIG. 6, during the period from a timing t2a to the timing t3; the first subframe data D1Rx, the second subframe data D1Gx, and the third subframe data D1Bx are equal to "1".

Moreover, in the present example, the second image signal $S_I$ also includes information (a signal value) indicating to turn ON the voltage applied to all of the first display element 106R, the second display element 106G, and the third display element 106B. In the comparison example, in a frame of the second image signal $S_I$ too, the subframe data is generated according to the signal value of the second light source control signal $S_{LI}$. Hence, in a frame of the second image signal $S_I$; the first image data D0Rx, the second image data D0Gx, as well as the third image data D0Bx has gradation of "1" or more according to the signal value of the second image signal $S_I$. Thus, the first subframe data D1Rx, the second subframe data D1Gx, as well as the third subframe data D1Bx includes a period corresponding to "1". In the example illustrated in FIG. 6, during the period from a timing t1a to the timing t2; the first subframe data D1Rx, the second subframe data D1Gx, and the third subframe data D1Bx are equal to "1". Meanwhile, in the example illustrated in FIG. 6, the duration of the period in which the subframe data becomes equal to "1" in a frame of the second image signal $S_I$ (i.e., during the period from the timing t1a to the timing t2) is longer than the duration of the period in which the subframe data becomes equal to "1" in a frame of the first image signal $S_V$ (i.e., during the period from the timing t2a to the timing t3). However, that is only an exemplary case, and the durations of the periods are decided according to the first image signal $S_V$ and the second image signal $S_I$.

Herein, in the case in which the display elements 106 are driven with predetermined subframe data and at the same time an illumination light is constantly emitted by a light source onto the display elements 106; the intensity of the output light that is output from the display device 100, that is, the intensity of the light of the visible light image or the infrared light images is treated as the output-light response degree. Thus, it implies that, higher the output-light response degree, the higher is the intensity of the output light. Herein, the output-light response degree points to the intensity of the output light under the assumption that an illumination light is constantly emitted on the display elements 106. Hence, when the illumination light is not being actually emitted, the intensity of the actual output light becomes equal to zero even if the output-light response degree is higher than zero. That is, the output-light response degree can be said to indicate the orientation degree of the liquid crystals of the display elements 106 when the display elements 106 are driven with the subframe data. In that case, it is implied that, higher the output-light response degree, the closer is the orientation of the liquid crystals of the display elements 106 to the orientation in the state in which a voltage is applied. In the following explanation, in the state in which a voltage is applied, the orientation is referred to as the display orientation; and in the state in which a voltage is not applied, the orientation is referred to as the non-display orientation.

When a voltage is applied to the display elements 106, that is, when the subframe data is switched to "1", the orientation of the liquid crystals of the display elements changes from the non-display orientation to the display orientation, and hence the output-light response degree increases. In that case, since the light crystals change from the non-display orientation to the display orientation in a gradual manner, that is, since the change in the orientation of the liquid crystals is delayed with respect to the voltage; the output-light response degree gradually increases from the timing at which the subframe data is switched to "1" and becomes a constant value at the point of time when the display orientation gets set. Moreover, when the voltage applied to the display elements 106 is terminated, that is, when the subframe data is switched to "0"; the orientation of the liquid crystals of the display elements 106 changes from the display orientation to the non-display orientation, and hence the output-light response degree decreases. In that case, since the light crystals change from the display orientation to the non-display orientation in a gradual manner, the output-light response degree gradually decreases from the timing at which the subframe data is switched to "0" and becomes a constant value at the point of time when the non-display orientation gets set.

In the example illustrated in FIG. 6, an output-light response degree Ax gradually increases starting from the timing t1a, at which subframe data D1x changes to "1", and then becomes constant; and gradually decreases starting from the timing t2, at which the subframe data D1x changes to "0", and then becomes constant at zero. This behavior of the output-light response degree Ax is equivalent to the behavior of a second image signal $S_{Ix}$, that is, equivalent to the gradation of the infrared light image. Subsequently, the output-light response degree Ax gradually increases starting from the timing t2a, at which the subframe data D1x changes to "1", and then becomes constant; and gradually decreases starting from the timing t3, at which the subframe data D1x changes to "0" (i.e., the timing t1 of the next cycle T), and then becomes constant. This behavior of the output-light response degree Ax is equivalent to a first image signal $S_{Vx}$, that is, equivalent to the gradation of the visible light image. Herein, the second illuminated light (infrared light) is emitted during the period from the timing t1 to the timing t2. Hence, during the period from the timing t1a to the t2, an infrared light image is displayed that is based on the second illumination light (infrared light) according to the output-light response degree Ax during the period form the timing t1a to the timing t2. Moreover, the first illumination light (visible light) is emitted during the period from the timing t2 to the timing t3. Hence, during the period from the timing t2a to the timing t3 in which the output-light response degree Ax again starts to increase, a visible light image is displayed that is based on the first illumination light (visible light) according to the output-light response degree Ax during the period from the timing t2a to the timing t3. However, due to the delay in the change of orientation of the liquid crystals with respect to the voltage, for example, even during the period from the timing t2 to the timing t2a, the output-light response degree Ax remains present without becoming "0". For that reason, during the period from the timing t2 to the timing t2a in which it is not actually desirable to display visible light images, the visible light image gets displayed according to the output-light response degree Ax that remains present (the portion illustrated by a dashed-line circle in FIG. 6). The output-light response degree Ax that remains present is equivalent to the behavior of the second image signal $S_{Ix}$, that is, equivalent to the gradation of the infrared light image. Hence, during the period from the timing t2 to the timing t2a, the image meant to be an infrared light image gets displayed as a visible light image. For that reason, during the period from the timing t2 to the timing t2a, the viewer of visible light images happens to view the visible light image as a crosstalk.

Present Embodiment

FIG. 7 is a schematic diagram for explaining the display of an image according to the present embodiment. In the present embodiment, in a frame of the second image signal $S_I$, regardless of the signal value of the second image signal $S_I$, the voltage applied to the second display element 106G and the third display element 106B is maintained at a constant value (herein, zero) so as to hold down the occurrence of a crosstalk. The specific explanation is given below.

In the example illustrated in FIG. 7 too, the first image signal $S_V$ and the second image signal $S_I$ that are input are identical to the respective signals illustrated in FIG. 6. That is, the first image signal $S_V$ includes information indicating to turn ON the voltage applied to all of the first display element 106R, the second display element 106G, and the third display element 106B. Thus, in a frame of the first image signal $S_V$, the signal processing unit 22 generates the first image data D0R, the second image data D0G, and the third image data D0B in such a way that the generated pieces of data have gradation of "1" or more according to the signal value of the first image signal $S_V$; and the subframe data generating unit 26 generates the first subframe data D1R, the second subframe data D1G, and the third subframe data D1B to include a period corresponding to "1". Hence, in the present embodiment too, during the period from the timing t2a to the timing t3, the first subframe data D1R, the second subframe data D1G, and the third subframe data D1B become equal to "1". Moreover, during the period from the timing t2a to the timing t3, the pixel control unit 28 turns ON the voltage applied to the first display element 106R, the second display element 106G, and the third display element 106B. In this way, in a frame of the first image signal $S_V$, the pixel control unit 28 controls the voltage applied to the first display element 106R, the second display element 106G, and the third display element 106B according to the signal value of the first image signal $S_V$.

In the present embodiment, in a frame of the second image signal $S_I$, regardless the signal value of the second image signal $S_I$, the second image data D0G, which corresponds to the second display element 106G, and the third image data D0B, which corresponds to the third display element 106B, are set to have the gradation of "0". In the present example, the second image signal $S_I$ also includes information indicating to turn ON the voltage applied to all of the first display element 106R, the second display element 106G, and the third display element 106B. Hence, in a frame of the second image signal $S_I$, the signal processing unit 22 sets the gradation of the first image data D0R to "1" or more according to the signal value of the second image signal $S_I$. On the other hand, regardless of the signal value of the second image signal $S_I$, the signal processing unit 22 sets the gradation of the second image data D0G and the third image data D0B to "0". For that reason, in a frame of the second image signal $S_I$, the subframe data generating unit 26 generates the first subframe data D1R to include a period corresponding to "1", and at the same time generates the second subframe data D1G and the third subframe data D1B to not include a period corresponding to "1", that is, generates the second subframe data D1G and the third subframe data D1B in such a way that "0" is set during the entire period of the frame of the second image signal $S_I$. In the example illustrated in FIG. 7, according to the present embodiment, during the period from the timing t2a to the timing t3, the first subframe data D1R is set to "1"; and, during the period from the timing t2 to the timing t3, the second subframe data D1G and the third subframe data D1B are set to "0". During the period from the timing t2a to the timing t3, the pixel control unit 28 turns ON the voltage applied to the first display element 106R. Moreover, during the entire period from the timing t2 to the timing t3, the pixel control unit 28 turns OFF the voltage applied to the second display element 106G and the third display element 106B. In this way, in a frame of the second image signal $S_I$, the pixel control unit 28 controls the voltage applied to the first display element 106R according to the signal value of the second image signal $S_I$ and at the same time, regardless of the signal value of the second image signal $S_I$, turns OFF the voltage applied to the second display element 106G and the third display element 106B during the entire period of the frame of the second image signal $S_I$.

In the present embodiment, since the control is performed in the manner explained above, an output-light response degree AG of the second display element 106G and an output-light response degree AB of the third display element 106B behave in the manner illustrated in FIG. 7. That is, during the period from the timing t1 to the timing t2, since the second subframe data D1G and the third subframe data D1B are set to "0", the output-light response degrees AG and AB indicate the non-display orientation at the timing t2 at which the first illumination light (visible light) is emitted (the portion illustrated by a dashed-line circle in FIG. 7). For that reason, in the present embodiment, till the timing t2a, it becomes possible to prevent the visible light image (i.e., the green image light GM and the blue image light BM) from being displayed by the second display element 106G and the third display element 106B. Meanwhile, there are times when the output-light response degree of the first display element 106R remains present even after the timing t2. However, since the output-light response degrees AG and AB do not remain present, there is a decrease in the luminance of the residual image, thereby enabling holding down the occurrence of a crosstalk. Moreover, as a result of turning ON the voltage applied to the first display element 106R from the timing t1a to the timing t2; during that period from the timing t1a to the timing t2, the infrared image can be properly displayed using the second illumination light (the infrared illumination light IRL) emitted onto the first display element 106R.

Meanwhile, in the explanation given above, in a frame of the second image signal $S_I$, that is, during the period from the timing t1 to the timing t2, the voltage applied to the second display element 106G and the third display element 106B is set to zero. However, that is not the only possible case, and the voltage to be applied can be set to a constant value other than zero. Although the constant value can be set to an arbitrary value, it is desirable that the constant value is smaller than, for example, the voltage applied to the first display element 106R.

Moreover, in the explanation given above, in a frame of the second image signal $S_I$, the second image data D0G and the third image data D0B are set to have a constant gradation value (herein, "0"), so as to set the second subframe data D1G and the third subframe data D1B to a constant value (herein, "0") during the entire period of the frame of the second image signal $S_I$ and to set the voltage applied to the second display element 106G and the third display element 106B to a constant value (herein, zero). However, that is not the only possible case. Alternatively, for example, regarding the second image data D0G and the third image data D0B or regarding the second subframe data D1G and the third subframe data D1B, the calculation can be performed according to the signal value of the second image signal $S_I$; and, regarding the voltage applied to the second display element 106G and the third display element 106B, a constant value (herein, zero) can be set regardless of the abovementioned calculation. That is, in a frame of the second image signal $S_I$, the display device 100 can generate the gradation values of the second image data D0G and the third image data D0B according to the signal value of the second image signal $S_I$ and, regardless the gradation values of the second image data D0G and the third image data D0B, can set the second subframe data D1G and the third subframe data D1B to a constant value (herein, zero). Moreover, the display device 100 can generate the second subframe data D1G and the third subframe data D1B according to the signal value of the second image signal $S_I$ and, regardless of the values of the second subframe data D1G and the third subframe data D1B, can set a constant value (herein, zero) for the voltage applied to the second display element 106G and the third display element 106B.

Meanwhile, in the explanation given above, the display elements 106 used for displaying the lights of mutually different colors include the first display element 106R, the second display element 106G, and the third display element 106B. However, that is not the only possible case, and it serves the purpose as long as a plurality of display elements 106 is included. In the present embodiment, it can be said that, in a frame of the second image signal $S_I$, the pixel control unit 28 controls the voltage applied to some display elements of a plurality of display elements 106 according to the signal values of the input signals and at the same time, regardless of the signal values of the input signals, sets the voltage applied to some other display elements of a plurality of display elements 106 (i.e., the display elements other than the display elements for which the voltage to be applied is controlled according to the signal values of the input signals) to a constant value. In that case, in a frame of the first image signal $S_V$, the pixel control unit 28 can control the voltage applied to all display elements 106 according to the signal values of the input signals.

It can be said that, the plurality of display elements 106 includes display elements (referred to as "some display elements") that are illuminated by the second illumination light emitted by the second light source 102 in a frame of the second image signal $S_I$, and includes display elements (referred to as "some other display elements") that are not illuminated by the second illumination light emitted by the second light source 102 in a frame of the second image signal $S_I$. In that case, in a frame of the first image signal $S_V$, not only the display elements that are illuminated by the second illumination light emitted by the second light source 102 are illuminated by the first illumination light emitted by the first light source 101, but the display elements that are not illuminated by the second illumination light emitted by the second light source 102 are also illuminated by the first illumination light emitted by the first light source 101.

As explained above, the display device 100 according to the present embodiment includes: a plurality of display elements 106; the first light source 101 that emits the first illumination light having the first wavelength band; the second light source 102 that emits the second illumination light having the second wavelength band; the signal synthesizing unit 20; the pixel control unit 28; and the light source control unit 24. Based on the input signals, that is, based on the first image signal $S_V$ and the second image signal $S_I$, the signal synthesizing unit 20 generates the mixed image signal $S_F$ that includes alternate arrangement of the frames of the first image signal $S_V$, which is meant for displaying an image based on the first illumination light, and the frames of the second image signal $S_I$, which is meant for displaying an image based on the second illumination light. The light source control unit 24 controls the first light source 101 and the second light source 102. Based on the mixed image signal $S_F$, the pixel control unit 28 controls the voltage applied to the display elements 106. During the period in which the second illumination light is emitted (in a frame of the second image signal $S_I$), the pixel control unit 28 controls the voltage applied to some display elements of the plurality of display elements 106 according to the signal values of the input signals and, regardless of the signal values of the input signals, sets the voltage applied to some other display elements of the plurality of display elements 106 to a constant value. In the display device 100 according to the present embodiment, during the period in which the second illumination light is emitted, as a result of setting the voltage applied to the some other display elements to a constant value; at a timing after the timing t2 at which the first light source 101 emits light, it becomes possible to reduce the output-light response degrees of the some other display elements attributed to the light emitted by the second light source 102 (in the example illustrated in the present embodiment, the output-light response degrees AG and AB) (i.e., it becomes possible to change the orientation of liquid crystals to the non-display orientation). For that reason, at the start of emission of light by the first light source 101, it becomes possible to prevent a situation in which the output-light response degrees of the some other display elements remain present, and to hold down the occurrence of a crosstalk at the time of displaying images based on the light emitted by the first light source 101. Moreover, regarding the some display elements, since the voltage to be applied is controlled according to the input signals, the images based on the light emitted by the second light source 102 can also be displayed in an appropriate manner.

Furthermore, during the period in which the second illumination light is emitted, the voltage applied to the some other display elements is turned OFF. In the display device 100 according to the present embodiment, as a result of turning OFF the voltage applied to the some other display elements, it becomes possible to more suitably prevent a situation in which the output-light response degrees of the some other display elements (in the example according to the present embodiment, the output-light response degrees AG and AB) remain present, and to hold down the occurrence of a crosstalk at the time of displaying images based on the light emitted by the first light source 101.

Furthermore, the light source control unit 24 makes the first light source 101 emit the first illumination light onto all display elements 106, and makes the second light source 102 emit the second illumination light onto only some display elements. In the display device 100 according to the present embodiment, since the voltage applied to the some display elements, which are illuminated by the second illumination light, is controlled according to the input signals; the images based on the light emitted by the second light source 102 can be displayed in an appropriate manner.

Furthermore, the first illumination light represents visible light, and the second illumination light represents infrared light. In the display device 100 according to the present embodiment, at the time of displaying a visible light image and an infrared light image in a time-division manner, the occurrence of crosstalk can be prevented in an appropriate manner.

The display elements 106 include the first display element 106R representing the some display elements, and the second display element 106G and the third display element 106B representing the some other display elements. The first light source 101 emits red visible light onto the first display element 106R, emits green visible light onto the second display element 106G, and emits blue visible light onto the third display element 106B. In the display device 100 according to the present embodiment, the voltage applied to the second display element 106G and the third display element 106B, which are used to achieve the green color and the blue color, respectively, is turned OFF, so as to enable holding down the occurrence of a crosstalk in an appropriate manner.

FIG. 8 is a schematic diagram for explaining the display of an image according to another example of the present embodiment. As illustrated in FIG. 8, in the display device 100, while turning OFF the voltage applied to the second display element 106G and the third display element 106B in a frame of the second image signal $S_I$, the phase of the subframe data D1 can be shifted with reference to the phases of the first light source control signal $S_{LV}$ and the second light source control signal $S_{LI}$. For example, in the example illustrated in FIG. 8, the phase of the subframe data D1 is shifted to be temporally prior to the phases of the first light source control signal $S_{LV}$ and the second light source control signal $S_{LI}$. Thus, the timing at which the first subframe data D1R, which is set based on the signal value of the second image signal $S_I$, is changed to "0" (i.e., a timing t1b) arrives earlier than the timing t2 at which the second light source control signal $S_{LI}$ is set to "0"; and the timing at which the first subframe data D1R, which is set based on the signal value of the first image signal $S_V$, is changed to "0" (i.e., a timing t2b) arrives earlier than the timing t3 (the timing t1) at which the first light source control signal $S_{LV}$ is set to "0". As a result of such phase shifting, the output-light response degree of the first display element 106R can be reduced from the timing t1b onward and, during the period for displaying a visible light image from the timing t2 onward, the output-light response degree AR is prevented from remaining present (the portion illustrated by a dashed-line circle in FIG. 8), and the occurrence of a crosstalk attributed to the first display element 106R can also be held down in an appropriate manner.

According to the present disclosure, in the case of displaying a plurality of images based on lights having different wavelength bands, it becomes possible to hold down the occurrence of a crosstalk.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
   a plurality of liquid crystal display elements;
   a first light source that emits first illumination light having first wavelength band;
   a second light source that emits second illumination light having second wavelength band;
   a signal synthesizing unit configured to receive a first image input signal and a second image input signal and generate a mixed image signal in which first frames of the first image input signal, which is meant for displaying an image based on the first illumination light, and second frames of the second image input signal, which is meant for displaying an image based on the second illumination light, are repeated in an alternate manner;
   a pixel control unit configured to, based on the mixed image signal, control a voltage applied to the liquid crystal display elements so as to control orientation of liquid crystals of the liquid crystal display elements; and
   a light source control unit configured to control, based on the mixed image signal, the first light source to emit the first illumination light in the first frames and the second light source to emit the second illumination light in the second frames, wherein
   in the second frames in which the second illumination light is emitted, the pixel control unit is configured to control a first voltage applied to some liquid crystal display elements of the plurality of liquid crystal display elements according to signal value of the second image input signal and at same time, regardless of signal value of the second image input signal, set a second voltage applied to some other liquid crystal display elements of the plurality of display elements to a constant value smaller than the first voltage, wherein the second voltage being smaller than the first voltage prevents the second image input signal from remaining in the first frames in which the first illumination light is emitted, as a residual image due to a delay in a change in orientation of the liquid crystals with respect to a change in voltage after switching is made from the second illumination light to the first illumination light.

2. The display device according to claim 1, wherein, during period in which the second illumination light is emitted, the pixel control unit is configured to turn OFF the second voltage applied to the some other liquid crystal display elements.

3. The display device according to claim 1, wherein the light source control unit is configured to
make the first light source emit the first illumination light onto all of the liquid crystal display elements, and
make the second light source emit the second illumination light onto only the some liquid crystal display elements.

4. The display device according to claim 1, wherein the first illumination light is a visible light, and the second illumination light is an infrared light.

5. The display device according to claim 4, wherein the plurality of liquid crystal display elements include
a first liquid crystal display element representing the some liquid crystal display elements, and
a second liquid crystal display element and a third liquid crystal display element representing the some other liquid crystal display elements, and
the first light source
emits red visible light onto the first liquid crystal display element,
emits green visible light onto the second liquid crystal display element, and
emits blue visible light onto the third liquid crystal display element.

6. A control method for a display device that includes
a plurality of liquid crystal display elements,
a first light source that emits first illumination light having first wavelength band, and
a second light source that emits second illumination light having second wavelength band,
the control method comprising:
signal-synthesizing step of generating, based on an input signal, a mixed image signal in which first frames of a first image signal, which is meant for displaying an image based on the first illumination light, and second frames of a second image signal, which is meant for displaying an image based on the second illumination light, are repeated in an alternate manner;
pixel-controlling step of controlling, based on the mixed image signal, a voltage applied to the liquid crystal display elements so as to control orientation of liquid crystals of the liquid crystal display elements; and
light-source-controlling step of controlling, based on the mixed image signal, the first light source to emit the first illumination light in the first frames and the second light source to emit the second illumination light in the second frames, wherein
the pixel-controlling step includes controlling, in the second frames in which the second illumination light is emitted, a first voltage applied to some liquid crystal display elements of the plurality of liquid crystal display elements according to signal value of the input signal and at same time, regardless of signal value of the input signal, setting a second voltage applied to some other liquid crystal display elements of the plurality of liquid crystal display elements to a constant value smaller than the first voltage, wherein the second voltage being smaller than the first voltage prevents the second image signal from remaining in the first frames in which the first illumination light is emitted, as a residual image due to a delay in a change in orientation of the liquid crystals with respect to a change in voltage after switching is made from the second illumination light to the first illumination light.

* * * * *